United States Patent [19]

Clarke et al.

[11] Patent Number: 4,713,264
[45] Date of Patent: Dec. 15, 1987

[54] PROCESS OF FORMING PREPASTED WALLCOVERINGS

[75] Inventors: John B. Clarke; John F. Firth; John R. Walker, all of West Yorkshire, England

[73] Assignee: Allied Colloids Limited, England

[21] Appl. No.: 784,824

[22] Filed: Oct. 4, 1985

[30] Foreign Application Priority Data

Oct. 4, 1984 [GB] United Kingdom ............... 8425155

[51] Int. Cl.$^4$ ............................................. B05D 5/10
[52] U.S. Cl. ................................ 427/207.1; 427/389.9
[58] Field of Search ........................... 427/207.1, 389.9

[56] References Cited

U.S. PATENT DOCUMENTS 4,361,452 11/1982 Clarke et al. ............... 427/207.1 X

FOREIGN PATENT DOCUMENTS 2002400 2/1979 United Kingdom .

Primary Examiner—Bernard D. Pianalto
Attorney, Agent, or Firm—Ostrolenk, Faber, Gerb & Soffen

[57] ABSTRACT

Process of forming prepasted wallcovering comprising a porous surface that carries a dry coating of polymer particles that become adhesive when wetted by water is made by applying to the surface a dispersion of the particles in a non-aqueous liquid that is stabilized by a polymeric stabilizer and then evaporating the non-aqueous liquid. A dried residue of the dispersion must not form a coherent film and should have a softening point substantially independent of the softening point of the polymeric stabilizer. The polymeric stabilizer is preferably an oil. The non-aqueous liquid is preferably relatively non-volatile.

20 Claims, No Drawings

PROCESS OF FORMING PREPASTED WALLCOVERINGS

This invention relates to prepasted wallcoverings, by which we mean any sheet substrate that has a porous surface that is provided with a water wettable adhesive coating by which the substrate can, upon wetting with water, be bonded to a wall or other suitable surface. Various materials are known for use as the prepaste coating and, broadly, are selected from water soluble polymers and water insoluble but water swellable polymers. The polymers may be natural or synthetic.

The normal way of producing such coatings is by applying a wet coating to the porous surface, scattering dry adhesive particles on to this coating, and then drying the surface. Unfortunately, dusting of the particles into the ambient atmosphere creates a serious manufacturing problem.

In EP No. 8213 and EP No. 77618, this dusting problem is avoided by applying the particles in the form of a dispersion in oil. The dispersion is, in practice, made by reverse phase polymerisation. Since the particle size is small the process therefore involves dispersing aqueous monomer into the non-aqueous liquid in the presence of a water-in-oil emulsifier and then polymerising the monomer. In the example of EP No. 8213, it is stated that the polymerisation is conducted using conventional stabilisers of the type traditionally used in such processes, and in practice the stabilisers were of the type described in British patent specification No. 1,482,515. Reverse phase polymerisation can be conducted in the absence of stabiliser but the dispersions are less stable, especially if they are dehydrated.

Although application from a dispersion in non-aqueous liquid avoids the dusting problem, it tends to incur another inconvenient problem. Thus during handling the coated substrate during and after manufacture, adhesive material accumulates on the handling equipment. For instance when the prepasted material is carried on rollers, for instance during a printing operation, these rollers may become coated with adhesive and when the prepasted material is being embossed, the female bowl of the embossing unit may become coated. Accumulation of the adhesive material on the rollers, or on any other equipment associated with the manufacture and handling of the prepasted wallcovering, is very undesirable both because of the inaccuracies it generates and because the coating tends to become very sticky, presumably due to the ambient humidity. Accordingly after long production runs it is necessary to cleanse the apparatus and this is inconvenient and time consuming.

We have now surprisingly found that the contamination problem can be avoided and very satisfactory prepasted wallcoverings can be made, while avoiding or minimising the apparatus contamination problem, by achieving deep penetration of the adhesive particles into the substrate. We have further found that the most effective way of ensuring that this deep penetration occurs is to formulate the dispersion so that a dried residue of the dispersion does not form a coherent film, i.e., is not film forming.

In the invention a method of forming a prepasted wallcovering comprising a porous surface that carries a dry coating comprising polymer particles that become adhesive when the coating is wetted by water comprises applying to the surface a dispersion of discrete particles in a non-aqueous liquid and that is stabilised by a polymeric stabiliser and then evaporating the non-aqueous liquid, and the method is characterised in that a dried residue of the dispersion does not form a coherent film.

The dried residue mentioned above may be formed merely be spreading a small amount of the dispersion over a non-porous surface and evaporating the non-aqueous liquid. Since the particles are, in the dispersion, discrete they will not merge into one another during this evaporation but we have found that in all prior processes they were liable to be bonded into a coherent film by the other components of the dried dispersion, especially the polymeric stabiliser.

Whether or not the dried residue does form a coherent film can easily be ascertained by measuring the softening point of the dried residue. If the softening point of the residue is substantially independent of the softening point of the polymerisation stabiliser, it follows that there is not a coherent film and the polymerisation stabiliser is not contributing to the softening properties of the residue. If the softening point of the residue is closely related to the softening point of the polymerisation stabiliser then there is a coherent film. Thus it seems that some polymerisation stabilisers provide a dried residue that consists of a waxy film of stabiliser interconnecting discrete particles of adhesive, and upon measuring the softening point of this residue it is the softening point of the waxy film that is recorded.

Preferably the dried residue of the dispersion has a softening point above 260° C., this clearly indicating that the softening point is due to the discrete particles and not to the polymeric stabiliser.

Preferably the polymeric stabiliser is an oil at 25° C. and it appears that, during the drying operation, it soaks into the substrate or, at least, is incapable of forming a continuous film between the particles.

Accordingly the preferred stabiliser, when spread as a liquid film over a non-porous surface and dried at temperatures above 25° C. preferably does not form a coherent film or other solid deposit on the surface.

In normal processes where it is desired to evaporate a non-aqueous liquid, a volatile non-aqueous liquid is chosen in order to minimise the heat energy and time required for evaporation. The evaporation rate of solvents is often classified on a scale on which n-butyl acetate is 1. Generally when a non-aqueous liquid is to be evaporated, a liquid having an evaporation rate of above 3 or 4 or more is preferred. For instance trichloroethylene is often preferred and has an evaporation rate of 4.9. In the invention we have surprisingly found that the problem of contamination is greatly reduced if the non-aqueous liquid is less volatile than n-butyl acetate, preferably having an evaporation rate less than 0.5. Best results are obtained when the non-aqueous liquid has an evaporation rate below 0.3, preferably in the range of about 0.1 to 0.2. Suitable liquids are hydrocarbons having a boiling range mainly above about 180° C., with mineral spirits having a boiling range above 200° C., for instance 200° to 250° C., being particularly suitable.

When providing a dispersion in non-aqueous liquid of discrete polymer particles, it is normally considered commercially desirable to provide the dispersion with a solids content as high as possible. Typically the solids content is up to 60% or even higher. In the invention we have surprisingly found that contamination is reduced if the dispersion that is applied to the porous substrate is more dilute than usual, preferably having a solids content of below 55%, typically 20 to 50% with best results generally being obtained at 25 to 40%, or sometimes up to 50%, by weight solids. It is often convenient to make the dispersion initially in a more concentrated form and then dilute it with non-aqueous liquid having the desired relatively low evaporation rate.

Although it is recognised that the surface carrying the prepaste coating must be porous it is conventionally considered desirable for the porosity to be relatively low, and highly porous surfaces are generally considered to be associated with rather poor quality wallcoverings. In the invention we have surprisingly found tht the contamination problem is reduced, and a very satisfactory prepasted wallcovering is produced, if the porous surface has a very high porosity, preferably above 100, and most preferably above 250, for instance 350 to 500, cm$^3$/min.

The polymer particles in the dispersions are preferably synthetic polymers made from monoethylenically unsaturated monomers. The polymers may be non-ionic, anionic or cationic.

Suitable monoethylenically unsaturated non-ionic monomers include acrylamide and methacrylamide.

Suitable anionic monomers include acrylic acid, methacrylic acid and water soluble salts thereof, for instance the sodium or other alkali metal salts.

Suitable cationic monomers include aminoalkylated derivatives of acrylamide, methacrylamide, acrylic acid or methacrylic acid. The derivatives are preferably dialkylamino alkylated derivatives and most preferably are quaternised derivatives. Any alkylene and alkyl groups preferably contain 1 to 4 carbon atoms can be employed although adjacent alkyl groups may together form a ring or alkyl groups may be substituted by oxygen thereby converting them into hydroxyalkyl or alkoxy groups. Preferably alkyl groups are methyl or ethyl and alkylene groups are methylene or ethylene groups. Any conventional quaternising groups may be used, such as alkyl halide or alkyl sulphate. When the polymer is a polymer of an aminoalkylated group, the polymer may have been formed by aminoalkylating a preformed polymer, for instance polyacrylamide, but preferably is made by polymerising an aminoalkylated monomer. Similarly quaternisation is usually conducted before polymerisation.

Blends of anionic polymer particles with cationic polymer particles, and especially such blends wherein both types of particles are wholly or mainly insoluble are particularly preferred. Suitable blends are described in EP No. 77618.

The polymer particles may be soluble in water but usually some, and preferably at least 70% by weight, of the polymer particles are insoluble in water and, upon contact with water, swell but remain as discrete particles. Cross linking may occur spontaneously during drying but generally at least 70% of the particles, and preferably all the particles, are made using a cross linking agent.

Suitable cross-linking agents are well known and include N,N'-methylene bisacrylamide, ethylene glycol diacrylate or methacrylate, allyl acrylate and diallyl maleate. There are added in sufficient amount to the monomer mixture to produce water-swellable polymer particles. Usually the concentration of cross-linking agent will be within the range 50 to 1000 ppm based on the weight of the other monomers.

By saying that particles swell but remain as discrete particles in water, we are referring to the properties of the particles when a prepaste coating containing the particles is wetted.

By saying that the particles in the dispersion are discrete we mean that during the evaporation of the non-aqueous liquid they do not flow into one another. Such flowing will not occur if the particles are cross linked. If they are soluble then their discrete nature is achieved by virtue of the fact that the water content of the particles in the dispersion and dried residue is sufficiently low that the particles do not merge with one another. In the dispersion the particles generally contain less than 50%, preferably less than 25%, water based on polymer plus water.

The dispersion is preferably made by reverse phase polymerisation and if a blend of particle types is to be present then a blend of dispersions may be used. The reverse phase polymerisation is preferably conducted by dispersing aqueous monomer particles into a non-aqueous liquid in the presence of a water-in-oil emulsifier, followed by polymerisation. The polymeric stabilizer is added before the polymerisation.

It is generally desired that the particles should be substantially dry and so the dispersion may be dehydrated, for instance by azeotropic distillation, so as to remove some, or preferably substantially all, of the water. For instance the polymerisation may be conducted in a non-aqueous liquid which is a blend of a volatile liquid such as white spirit, kerosein or other low boiling hydrocarbon and a less volatile liquid. The volatile liquid is removed by azeotropic distillation and the less volatile liquid then serves as the carrier for the dispersion that is applied on to the porous surface.

The average particle size and the particle size range can be controlled by the amount of shear applied when forming the initial dispersion and by the components, especially the emulsifier, in the initial dispersion. Preferably the polymerisation is conducted predominantly uner suspension kinetics. The particle size of the final polymer particles is then the same as, or greatly influenced by, the particle size of the initial droplets of aqueous monomer in the non-aqueous liquid. This in turn is greatly influenced by the choice of non-aqueous liquid and the materials and amounts used as polymerisation stabiliser and (if present) water in oil emulsifier, and also by the amount of shear or other mechanical energy applied to the dispersion during its initial formation. Preferably the process is conducted in the presence of a water in oil emulsifier as this reduces the amount of shear necessary to achieve the desired particle size.

Particle size can be reduced, and the presence of oversize particles minimised, by various techniques. For instance when the polymerisable material is ionic, the polymerisation stabiliser may be of a charge type opposite to that of the polymerisable material and the formation of the dispersion may be conducted in the presence of a water soluble, substantially oil insoluble, ionic, non-polymerisable compound having the same charge type as the polymerisable material and having at least one alkyl group containing at least six carbon atoms, for instance as described in more detail in our EP No. 102760.

In another process, the dispersion is formed in the presence of at least one non-ionic cmpound selected from $C_{6-12}$ alkanols, $C_{4-12}$ alkylene glycol monoethers and their $C_{1-4}$ alkanoates, $C_{6-12}$ polyalkylene glycol monoethers and their $C_{1-4}$ alkanoates or benzyl alcohol, most preferably in the presence of diethylene glycol monobutyl ether or, preferably, its acetate, as described in European patent application No. 84302079.3. However some of these additives may have the tendency of solvating ink that is printed on to the substrate and so may cause damage to the print, for instance due to migration of the additive during or subsequent to rolling the prepasted sheet material after printing. Accordingly the dispersion is preferably free of any materials that will remain in the prepaste coating and which may solvate or otherwise cause damage to the print properties.

The dry particle size should always be below 10 microns and is preferably below 4 microns. We find the best results are achieved with a very narrow range of particle sizes, and in particular when the particles have an average particle size below 1.5 microns and at least 70% by weight of the particles have a particle size below 2 microns. Preferably the average particle size of the particles is below 1 micron. Preferably at least 80% by weight of the particles have a size less than 2 microns. In preferred materials at least 40%, and preferably at least 60%, by weight of the particles have a particle size below 1 micron.

Polymeric stabilisers conventionally used for reverse phase polymerisation processes, and in particular polymeric stabilisers used for the production of the dispersions described in EP No. 8213 and EP No. 77618 are materials such as those described in GB No. 1,482,515 and they are waxy solids, typically having a softening point of about 140° C. They are therefore unsuitable for use in the invention.

The preferred dispersion stabiliser for use in the reverse phase polymerisation process is one of the block or graft copolymers described in British patent specification No. 2002400A and which can be considered to be surfactants in the system, and in particular is a copolymer having a general formula $(A-COO)_m-B$, wherein m is an integer at least 2, wherein each polymeric component A has a molecular weight of at least 500 and is the residue of an oil-soluble complex monocarboxylic acid having the general structural formula 1 in which R is hydrogen or a monovalent hydrocarbon or substituted hydrocarbon group;

$R_1$ is hydrogen or a monovalent $C_1$ to $C_{24}$ hydrocarbon group;

$R_2$ is a divalent $C_1$ to $C_{24}$ hydrocarbon group;

n is zero or 1;

p is an integer from zero up to 200; and wherein each polymeric component B has a molecular weight of at least 500 and, in the case where m is 2, is the divalent residue of a water-soluble polyalkylene glycol having the general formula 2 in which $R_3$ is hydrogen or a $C_1$ to $C_3$ alkyl group;

q is an integer from 10 up to 500; or in the case where m is greater than 2, is the residue of valency m of a water-soluble polyether polyol having the general formula 3 in which $R_3$ and m have their previous significance;

r is zero or an integer from 1 to 500, $R_3$ provided that the total number of groups of formula 4 in the molecule is at least 10;

$R_4$ is the residue of an organic compound containing in the molecule m hydrogen atom reactive with an alkylene oxide.

Preferred values for R to $R_4$ and for m, n, p, q and r are all as discussed in more detail in that British patent specification and the materials are preferably made by the methods described therein. Particularly preferred non-film forming stabilisers are condensates of polyhydroxy stearic acid with polyethylene glycol, as described in that specification.

The amount of stabiliser used in reverse phase polymerisation processes is usually from 0.1 to 10%, preferably 2% to 4% by weight of the aqueous monomer solution (typically 2 to 8% by weight on monomer).

Water in oil emulsifier is generally present in an amount of from 0.1 to 10%, preferably 0.5 to 5% by weight of the aqueous monomer solution (typically 1 to 5% by weight on monomer). Typically the material will have HLB of from 4 to 6. Emulsifiers that are conventional for reverse phase polymerisation may be used and include sorbitan monostearate, sorbitan monooleate, glyceryl monooleate and ethoxylated fatty alcohols.

The concentration of monomers present before polymerisation, or the concentration of polymer after polymerisation, is generally from 20 to 80%, preferably 35 to 70%, by weight of the aqueous phase. The volume ratio of non-aqueous to dispersed aqueous phase is generally from 0.3 to 3.0, preferably 0.4 to 1.5. Polymerisation may be initiated by any conventional manner, for instance by photo, redox or thermal initiation.

When viewed under a microscope, the coatings obtained in the invention show the polymer particles impregnated into the substrate, with no continuous film on the surface, wheres the prior art products had the appearance of a layer of craked mud over the surface of the substrate. The contamination problem presumably arose from this coating peeling off the substrate. The prepaste coating preferably consists only of the selected polymer particles and residual stabiliser and emulsifier, if present. The coating eight is preferably from 2 to 8 g/m² dry weight, although amounts of for instance from 1 to 12 g/m² may sometimes be suitable.

As an example, blends of 90 parts swellable anionic polymer with 10 parts swellable cationic polymer and broadly as described in Example 3 of EP No. 77618 are prepared from reverse phase polymerised dispersions prepared generally as described in Example 1 of EP No. 8213 except that in one process (A) the reverse phase polymerisation is conducted using 3% (based on monomer) sorbitan mono-oleate and 5% (on monomer) of a stabiliser as described in GB No. 1482515 and in the other process (B) the stabiliser emulsifier system that is used is a mixture of 3% (based on monomer) sorbitan mono-oleate with an equal amount of a condensate or polyethylene glycol mw 1500 with poly 12 hydroxy stearic acid mw 1200–1500. This is an oil.

The non-aqueous liquid was a blend of volatile oil (which was distilled off during azeotropic distillation of the dispersion to produce dry polymer particles in the dispersion) and mineral spirits (which remained in the dispersion). The particle size of B was 70% below 1.5 microns.

2 gm samples of each adhesive were dried out in an oven. Particles of dried material were spread along a KOFLER HEIZBANK hot bar which consists of a 30 cm graduated scale beginning at 50° C. and maximising at 260° C. The softening point of each of the samples was determined. For the product of process A, the softening was about 140° C., which is approximately the softening point of the polymeric stabiliser. The product of process B did not soften, and thus had a softening point of above 260° C.

Samples of dispersions A and B were applied on to various porous cellulosic substrates. They were dried in a forced air draft oven and allowed to condition at 55 to 60% relative humidity for 60 minutes. A standard abrasion test was then applied to the surface by placing a 2.5 cm wide strip of black paper on the surface of the adhesive film and drawing it across the film over a 20 cm length under a pressure of 500 gm cm$^{-2}$. The degree of removal was assessed on a scale of 0 to 5, 0 being the optimum (no removal) and 5 being severe removal.

When the non-aqueous liquid in products A and B was mineral spirits of boiling range 200° to 250° C., the degree of removal was 4 to 5 for product A and 0 to 1 for product B. This clearly demonstrates the superiority of the invention.

When the mineral spirits was replaced by trichloroethylene in product B, the degree of removal increased significantly.

The test was insufficiently sensitive to show variations in the degree of removal when using product B under different conditions, even though such variations would be critical on a commercial scale. To show the effect of variations in paper porosity, solids content and non-aqueous liquid tests were therefore conducted on product A.

When using product A for coating papers of porosity values of 10, 140, 200, 410 cm$^3$/min respectively, the degree of removal was about 4, 2, 1 to 2 and 0 to 1 respectively. When applying product B at a solids content of 70% on to a particular substrate, the degree of removal was 4 but at 60% it was 3, 50% 2 and 25% 1 to 2.

When applying product A from trichloroethylene (evaporation rate 4.9), the degree of removal was 4.5 but when applying it from mineral spirits (evaporation rate 0.1 to 0.2) the degree of removal was 1 to 2.

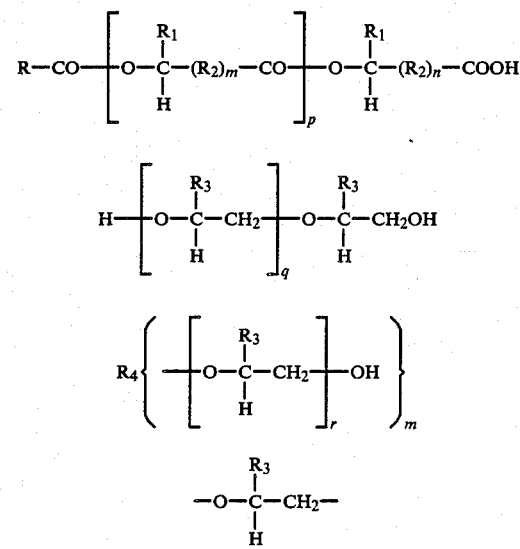

We claim:

1. A process of forming a prepasted wallcovering comprising a porous surface that carries a dry coating comprising discrete polymer particles that become adhesive when the coating is wetted by water, the process comprising applying to the surface a dispersion of polymer particles having a dry size below 10 microns in a non-aqueous liquid and that is stabilised by a polymeric stabiliser which is an oil at 25° C. and then evaporating the non-aqueous liquid and in which a dried residue of the dispersion does not form a coherent film.

2. A process according to claim 1 in which the dried residue of the dispersion has a softening point substantially independent of the softening point of the polymeric stabiliser.

3. A process according to claim 1 in which the dried residue of the dispersion has a softening point greater than 250° C.

4. A process according to claim 1 in which the particles contain less than 25% water based on polymer plus water.

5. A process according to claim 1 in which the polymeric stabiliser is a condensate of polyethylene glycol with polyhydroxy stearic acid.

6. A process according to claim 1 in which the dispersion is made by reverse phase polymerisation of a dispersion of aqueous monomer in oil formed in the presence of a water-in-oil emulsifier.

7. A process according to claim 1 in which the non-aqueous liquid is less volatile than n-butyl acetate.

8. A process according to claim 1 in which the non-aqueous liquid has a boiling point mainly above 180° C.

9. A process according to claim 1 in which the particles have an average particle size of below 1.5 microns with at least 70% by weight of the particles being below 2 microns.

10. A process according to claim 1 in which at least 70% by weight of the particles swell but remain as discrete particles in water.

11. A process according to claim 1 in which the porous substrate has a porosity of greater than 100 cm$^3$/min.

12. A process according to claim 1 in which the solids content of the dispersion is below 50%.

13. A process of forming a prepasted wallcovering comprising a porous surface that carries a dry coating comprising discrete polymer particles that become adhesive when the coating is wetted by water, the process comprising applying to the surface a dispersion of polymer particles having a dry size below 10 microns in a non-aqueous liquid which is less volatile than n-butyl acetate and that is stabilised by a polymeric stabiliser consisting essentially of a material which is an oil at 25° C. and then evaporating the non-aqueous liquid and in which a dried residue of the dispersion does not form a coherent film.

14. A process according to claim 13 in which the dried residue of the dispersion has a softening point substantially independent of the softening point of the polymeric stabiliser, the particles have an average particle size of below 1.5 microns with at least 70% by weight of the particles being below 2 microns and in which the solids content of the dispersion is below 50%.

15. A process according to claim 14 in which the dried residue of the dispersion has a softening point greater than 250° C. and in which the porous substrate has a porosity greater than 100 cm$^3$/min.

16. A process according to claim 15 in which the polymeric stabiliser consists essentially of a condensate of polyethylene glycol with polyhydroxy stearic acid.

17. A method of forming a prepasted wallcovering comprising a porous surface that carries a dry coating comprising discrete polymer particles that become adhesive when the coating is wetted by water, the method comprising applying to the surface a dispersion of polymeric particles in a non-aqueous liquid and then evaporating the liquid and in which the polymeric particles in the dispersion contain less than 25% by weight water, based on polymer plus water, and have a dry size below 10 microns, and the dispersion has been formed by reverse phase polymerization followed by azeotroping, and the dispersion is stabilised by a polymeric stabiliser which is an oil at 25° C. and in which a dried residue of the dispersion does not form a coherent film.

18. A method according to claim 17 in which the dried residue of the dispersion has a softening point greater than 250° C.

19. A method according to claim 18 in which the non-aqueous liquid is less volatile than n-butyl acetate.

20. A method according to claim 19 in which the particles have an average particle size of below 1.5 microns with at least 70% by weight of the particles being below 2 microns.

* * * * *